United States Patent
Kang et al.

(10) Patent No.: US 10,131,284 B2
(45) Date of Patent: Nov. 20, 2018

(54) OBJECT HOLDING DEVICE FOR A VEHICLE SEAT

(71) Applicant: Ford Global Technologies, LLC, Dearborn, MI (US)

(72) Inventors: Connie Kang, Nanjing (CN); Zhenwei Cai, Nanjing (CN); Stella Zhang, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 4 days.

(21) Appl. No.: 15/485,098

(22) Filed: Apr. 11, 2017

(65) Prior Publication Data

US 2017/0305354 A1  Oct. 26, 2017

(30) Foreign Application Priority Data

Apr. 21, 2016  (CN) .......................... 2016 1 0252201

(51) Int. Cl.
  *B60R 7/08*  (2006.01)
  *B60R 7/04*  (2006.01)

(52) U.S. Cl.
  CPC .............. *B60R 7/081* (2013.01); *B60R 7/043* (2013.01)

(58) Field of Classification Search
  CPC ......... B60R 7/081; B60R 7/043; B60N 3/004; B60D 11/0638; A47B 39/00; A47B 5/00; A47C 7/70; A47C 7/68
  USPC ........ 108/44, 42, 47, 43; 297/163, 135, 146, 297/147
  See application file for complete search history.

(56) References Cited

U.S. PATENT DOCUMENTS

| | | | | |
|---|---|---|---|---|
| 421,118 A | * | 2/1890 | Walsh ................... | A47C 13/00 297/118 |
| 659,431 A | * | 10/1900 | Anderson .............. | A47B 27/00 108/152 |
| 889,526 A | * | 6/1908 | James ................ | B64D 11/0638 297/146 |
| 1,398,496 A | * | 11/1921 | Saltalamachia .......... | A47B 5/06 108/47 |
| 1,624,862 A | * | 4/1927 | Elliot .............................. | 108/47 |
| 1,887,102 A | * | 11/1932 | Mathie ................... | A47B 63/02 108/47 |

(Continued)

FOREIGN PATENT DOCUMENTS

| CN | 204712984 U | 10/2015 |
|---|---|---|
| GB | 2511207 A | 8/2014 |

OTHER PUBLICATIONS

"Long arm Universal Tablet Car Headrest Back Seat Mount Holder Bracket" (non-patent literature filed with IDS).

*Primary Examiner* — Jose V Chen
(74) *Attorney, Agent, or Firm* — Vichit Chea; Mohr IP Law Solutions, PC (57) ABSTRACT

The present invention provides an object holding device used in a vehicle seat. The object holding device comprises an object holder coupled to an extendable device via a deployment rod and is extended and retracted in and out a map pocket of the vehicle seat. An extendable rod of the extendable device is pivotably connected with the deployment rod and lockable with the deployment rod. At a first position where the deployment rod forms a first angle with the extendable rod, the object holder is changeable at a slanted position and a leveled position to hold an object.

18 Claims, 8 Drawing Sheets

(56) References Cited

U.S. PATENT DOCUMENTS

| | | | | |
|---|---|---|---|---|
| 2,255,654 | A | * | 9/1941 | Davis .................... A47B 23/02 248/444 |
| 3,773,381 | A | * | 11/1973 | Brennan ................. A47C 7/70 108/45 |
| 4,159,071 | A | * | 6/1979 | Roca ....................... A47C 7/70 108/42 |
| 4,862,812 | A | * | 9/1989 | Godfrey ................ A47B 5/006 108/47 |
| 5,947,033 | A | * | 9/1999 | Lombardo ............ B60N 3/004 108/44 |
| 6,773,060 | B2 | * | 8/2004 | Sher ................... A47B 21/0314 248/918 |
| 8,141,948 | B2 | | 3/2012 | Cassellia et al. |
| 8,474,917 | B2 | | 7/2013 | Line et al. |
| 8,905,470 | B2 | | 12/2014 | Shih et al. |
| 8,936,307 | B2 | * | 1/2015 | Heredia ............. B64D 11/0015 297/146 |
| 2006/0214479 | A1 | | 9/2006 | Dwire et al. |
| 2009/0089841 | A1 | | 4/2009 | Hanlon et al. |
| 2013/0036949 | A1 | * | 2/2013 | Nguyen ............... A47B 23/002 108/6 |
| 2014/0183910 | A1 | * | 7/2014 | Ulbrich-Gasparevic .................... B60N 3/004 297/135 |

* cited by examiner

OBJECT HOLDING DEVICE FOR A VEHICLE SEAT

RELATED APPLICATION

This application claims the benefit of Chinese Patent Application No.: CN 201610252201.X filed on Apr. 21, 2016, the entire contents thereof being incorporated herein by reference.

FIELD

The invention relates to an object holding device used on a vehicle seat, in particular, an object holding device having multiple usages.

BACKGROUND

A back of a vehicle's front seat toward a passenger usually includes a map pocket for a rear seat passenger to place a map, a cell phone, etc. However, the passenger often needs a panel to place or support the cell phone, a laptop computer or book for the convenience of use and reading. Thus, an object holding device is needed to be disposed on the back of the front seat.

The object holding devices in the current art are usually exposed to the exterior, for example, a cup holder disposed between the rear seats or a central console. Such object holding device usually have a single function and cannot satisfy the passenger's needs.

SUMMARY

To solve the issues in the relevant technologies, the present invention provides an object holding device with multiple usage, which does not impact the interior space and the appearance of the vehicle at a stowed position and does not affect the use of the vehicle seat when is in use.

According to one aspect, the present disclosure provides an object holding device attached to a vehicle seat. The object holding device comprises an object holder connected to an extendable device via a deployment rod so as to be extended out or retracted in a map pocket. An extendable rod of the extendable device is pivotably connected and lockable with the deployment rod. At a first position where the deployment rod forms a first angle with the extendable rod, the object holder is changeable between a slanted position and a horizontal position.

According to an embodiment, the object holding device at the first position where the deployment rod forms a first angle with the extendable rod, the object holder is rotatable toward a vehicle seat.

According to an embodiment, at the first position where the deployment rod forms a first angle with the extendable rod, the object holder is rotatable away from the vehicle seat.

According to an embodiment, the first angle is about 90 degrees.

According to an embodiment, the extendable device further includes a rail disposed in the map pocket, the extendable rod is capable of sliding in the rail and being locked, and wherein an end of the deployment rod is pivotably connected with the extendable rod and another end of the deployment rod is pivotably connected with the object holder.

According to an embodiment, either one of the extendable rod or the rail includes a lock member, and another one of them includes a lock latch coupling with the lock member.

According to an embodiment, the locking member and the lock latch include one of a magnetic device, a spring lock/latch, and a thread hole/screw mechanism.

According to an embodiment, an object support of the object holding device includes a first surface and a second surface opposite to the first surface. The first surface is a retaining surface for the object at a slanted, and the second surface is a holding surface at a horizontal position, and wherein, at least one surface includes an object clamping device.

According to an embodiment, a sliding rail is disposed on the first surface, the object clamping device includes a first clamping member and a second clamping member which are slidable in the sliding rail to adjust a width in-between, and the first and second clamping members collectively grasp the object.

According to an embodiment, the clamping device includes one or more of an object support for an electronic device, a pen holder, and a business card holder.

According to an embodiment, an object support is disposed at an edge of the first surface and the object support is at a bottom of the first surface at the slanted position to support the object.

According to an embodiment, the object holding device further comprises a locking assembly disposed between the deployment rod and the object holder to lock and unlock the deployment rod and the object holder.

According to an embodiment, the locking assembly of the object holding device includes one of a support rod, a bi-directional mechanism, a thread hole/screw mechanism and a spring lock/latch.

According to an embodiment, the deployment rod is pivotably connected with the extendable rod, and a locking assembly is disposed to lock and unlock the deployment rod and the object holder.

According to another aspect, an object holding device disposed on a seatback of a vehicle is provided. The object holding device comprises a deployment rod having a first end and a second end; an object holder pivotably connected with the first end of the deployment rod; and an extendable rod pivotably connected to the second end of the deployment rod. The extendable rod is extended and retracted along its length direction. The deployment rod forms a first angle with the extendable rod at a first position, and the object holder is moveable between a slanted position and a leveled position when the deployment rod is at the first position.

According to an embodiment, the object holder further comprises a rail attached to the seatback. The extendable rod is slidably connected to the rail and lockable by a locking device.

According to an embodiment, the object holding device further comprises a map pocket, and the extendable rod and the deployment rod are concealed in the map pocket at a non-use position.

According to an embodiment, the deployment rod is rotated away from the seatback to form the first angle, and the first angle is about 90 degrees at the first position.

According to an embodiment, the object holder is tilted away from a user at the slanted position and tilted toward the user to be substantially horizontal at the leveled position.

According to an embodiment, the object holder has a first surface and a second surface opposite the first surface. The first surface faces a user and retains an object at the slanted position, and wherein the second surface faces up to hold the object at the leveled position.

According to an embodiment, the object holder includes a clamping device attached to the first surface to hold the object at the slanted position.

According to an embodiment, the object holder further includes an object support adjacent to an edge to retain the object at the slanted position.

According to an embodiment, the deployment rod further includes an extended part to adjust a distance between the object holder and a user at a use position.

According to an embodiment, the extended rod includes a lock member and the rail includes a plurality of lock catches so that the extendable rod is locked at a plurality of positions to enable the object holder to be maintained at different heights.

The invention has various advantages. For example, the object holding device of the present disclosure includes an object holder connected to an extendable device and is extended and retracted along its length direction in a map pocket. The object holder can support an object when is deployed, and is retracted back to the map pocket when it is not used to hold the object, and thus the space and the appearance of the vehicle interior are not adversely impacted. Further, when the extendable rod of the extendable device is at a first position that the deployment rod forms a first angle with the extendable rod, the object holder is changeable at a slanted position and a leveled position for multiple applications. Furthermore, the pivoting of the deployment rod relative to the extended rod away from the seat enables the object holder to be positioned at a slanted position without affecting the normal use of the seat

BRIEF DESCRIPTION OF THE DRAWINGS

In order to clearly describe the invention, the figures for the embodiments are briefly described below. Apparently, the figures described below are only some embodiments of the present invention. The ordinary technician in this friend may obtain other figures according to these figures without the inventive step.

DETAILED DESCRIPTION

Example embodiments will be more clearly understood from the following brief description taken in conjunction with the accompanying drawings. The accompanying drawings represent non-limiting, example embodiments as described herein.

Figure 1:
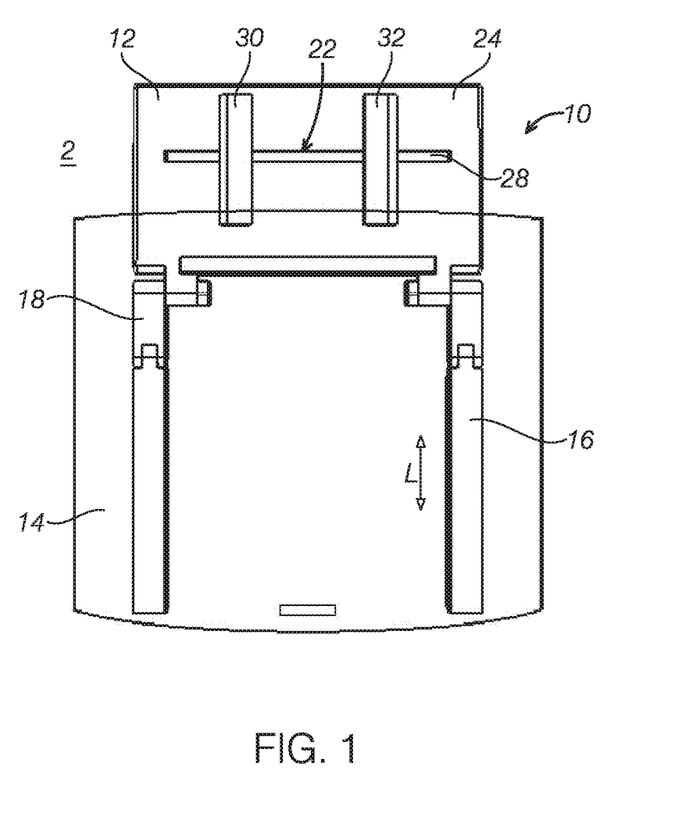
FIG. 1 is a schematic diagram of an object holding device according to one embodiment of the present disclosure and a portion covered by a map pocket is shown to clearly illustrate the object holding device.
Figure 2:
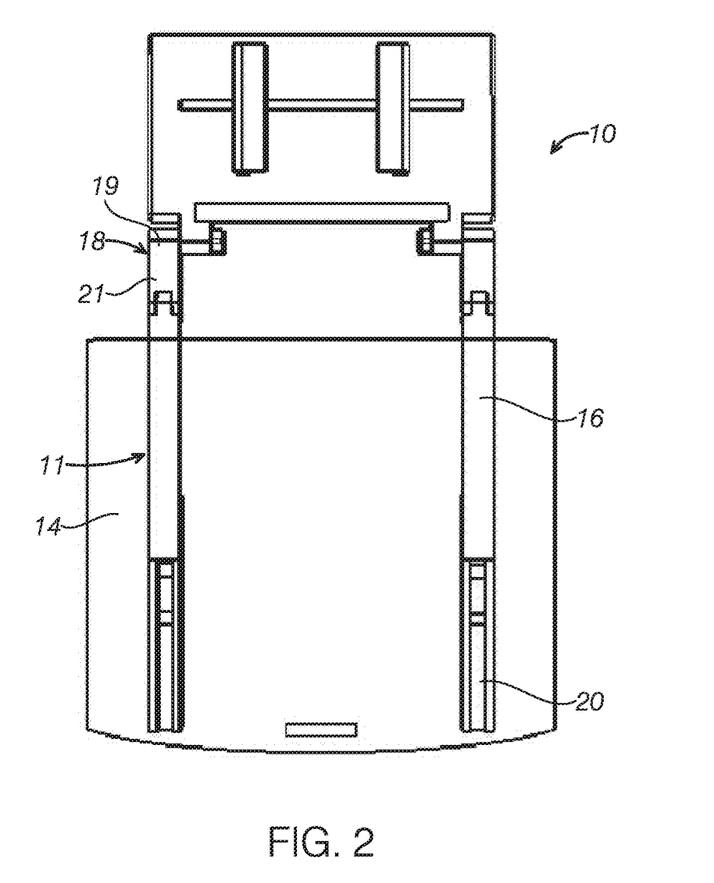
FIG. 2 is a schematic diagram of the object holding device in FIG. 1, illustrating the object holding device at an extended position d and a portion covered by the map pocket is shown.

Referring to the FIGS. 1 and 2. FIG. 1 is a schematic diagram of an object holding device 10 attached to a seatback 2 at a non-use position, and FIG. 2 is a schematic diagram of an extending device 11 of the object holding device 10 at an extending position. In this embodiment, the object holding device 10 includes an object holder 12 connected to the extendable device 11 via a deployment rod 18 so as to be extendable between positions inside and outside of a map pocket 14. The extending device 11 may include an extendable rod 16 extendable along its length L. The extendable rod 16 may be pivotally connected with and lockable with the deployment rod 18. As shown in FIG. 1, the extending rod 16 and the deployment rod 18 are concealed in the map pocket at the non-use position.

Figure 3:
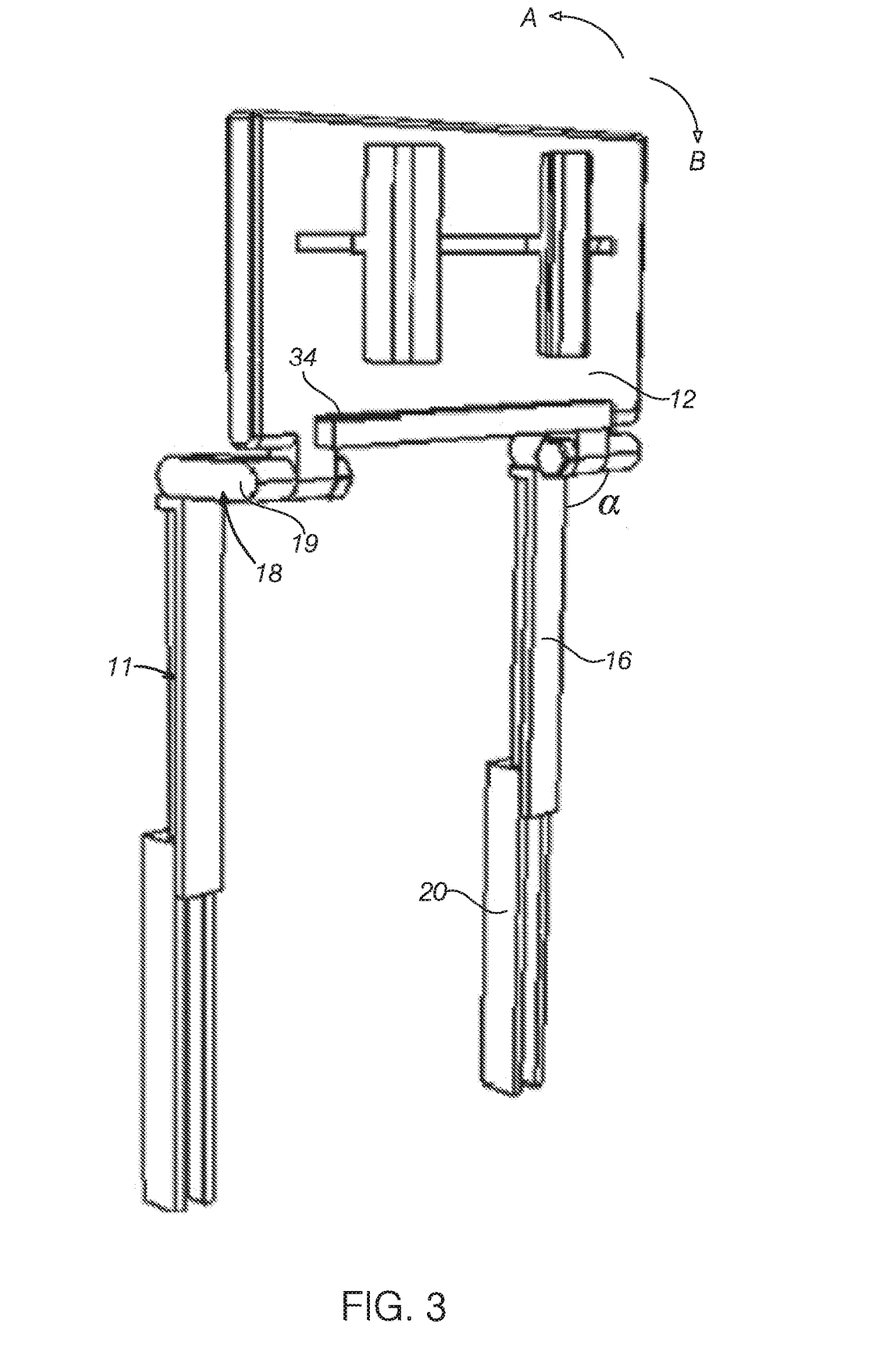
FIG. 3 is a perspective view of the object holding device in FIG. 2.
Figure 4:
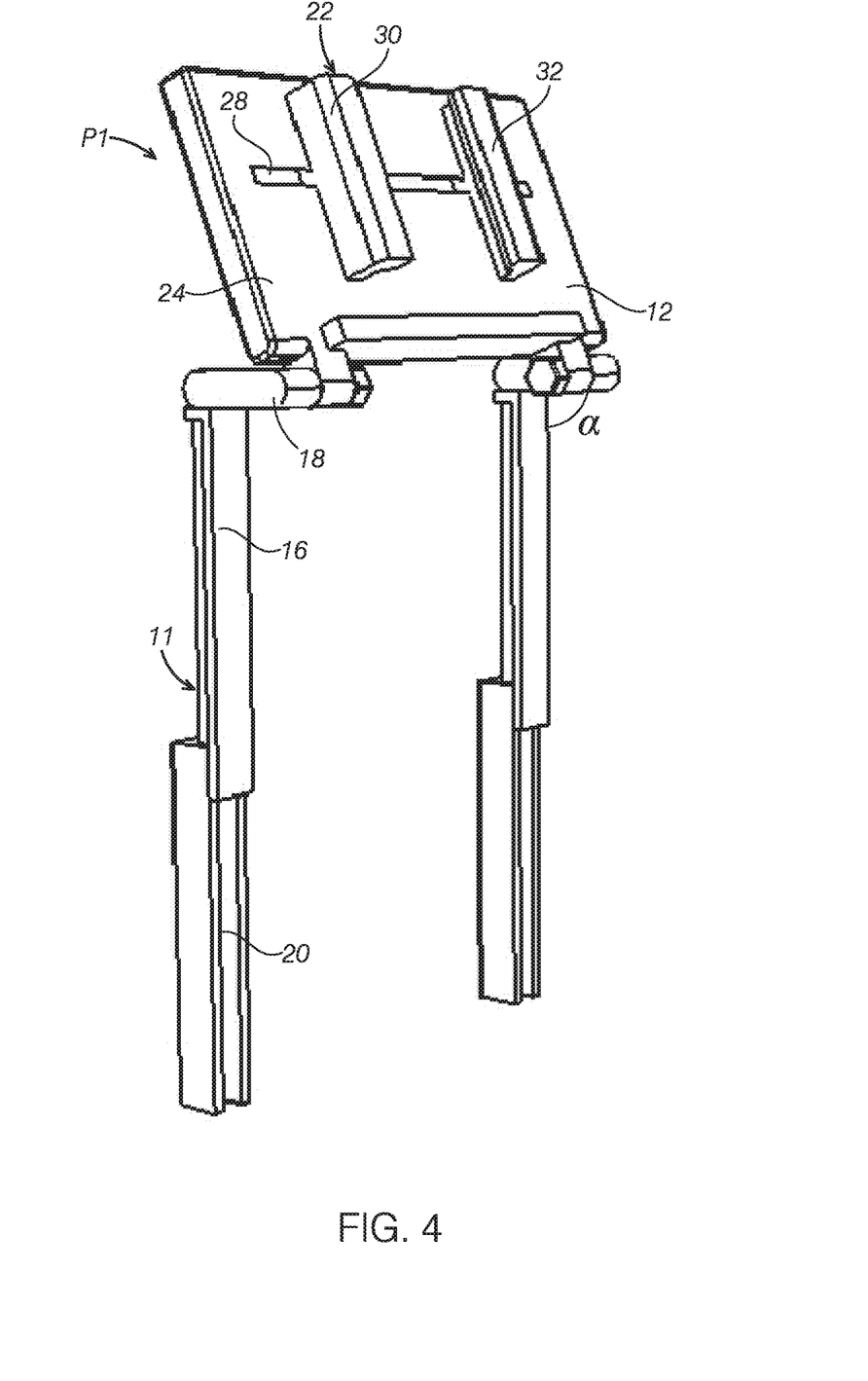
FIG. 4 is a schematic diagram of an object holding device according to one embodiment of the present disclosure, illustrating an object holder at a slanted position.
Figure 5:
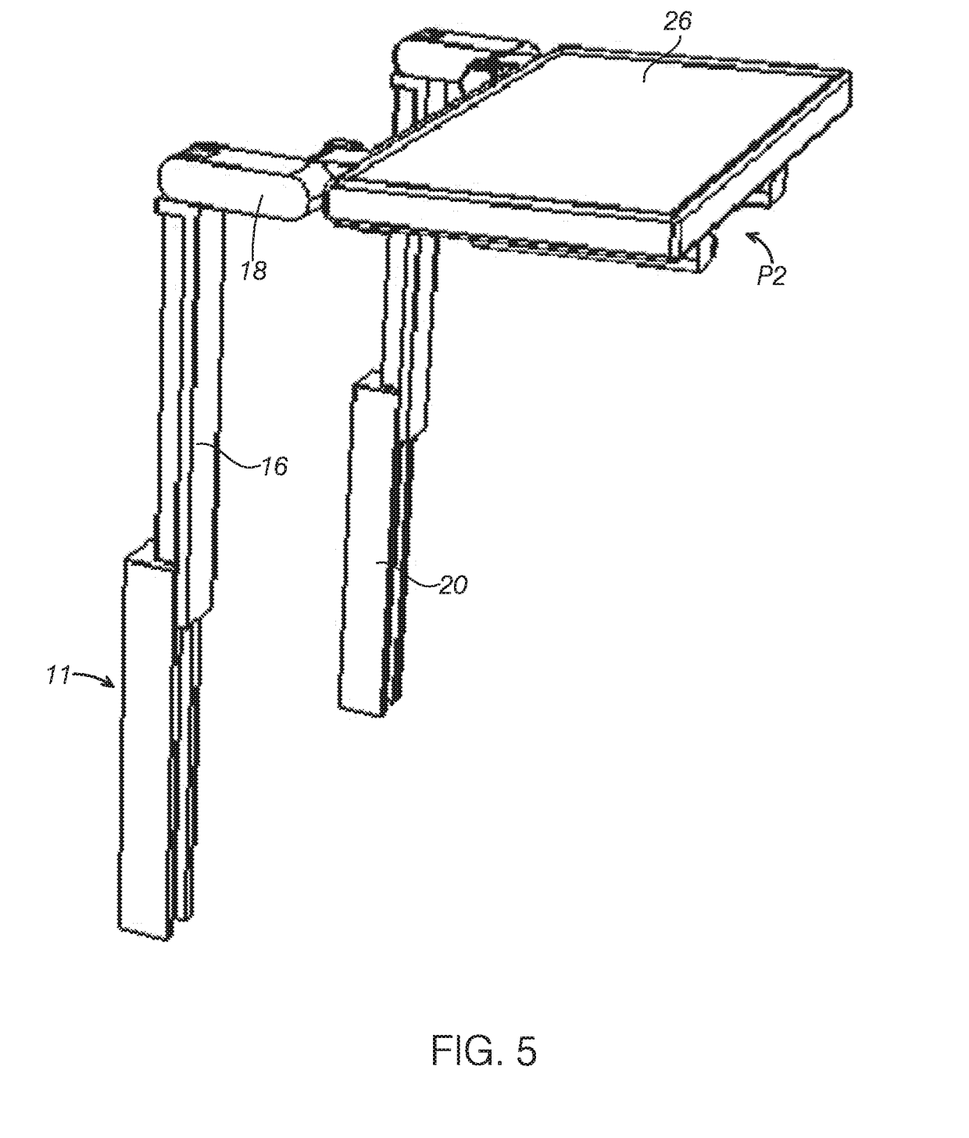
FIG. 5 is a schematic diagram of the object holding device according to one embodiment of the present disclosure, illustrating the object holder at a horizontal position.

The object holder 12 may be changeable or movable between a slanted position P1 and a leveled position P2 when the deployment rod 18 is at a first position with the extendable rod 16 at a first angle $\alpha$ as shown in FIG. 3 to 5.

It should be appreciated that the leveled position P2 does not only that the object holder 12 is a horizontal position. Under some circumstances, the object holder 12 may be at a position having an angle with the horizontal direction for better holding objects so that a user has a good use experience. For example, the object holder 12 at the leveled position P2 may be 5 degree, 10 degree, or 15 degree, respectively, relative a horizontal surface.

In the above described embodiment, the object holding device 10 includes an object holder 12 connected with an extendable device. The object holder 12 is extendable and extractable in and out of the map pocket 14 on the seat. The object holder 12 may be used to support the object at a deployed position. The object holder 12 may be retracted back into the map pocket 14 when the object holding device 10 is not in use, thus there are no impacts on the space and the appearance of the vehicle's interior.

In addition, when the deployment rod 18 forms a first angle $\alpha$ with the extendable rod 16 at first position, the object holder is rotatable or changeable between a slanted position and a leveled position for versatile applications, such as, placing a cell phone, a laptop computer, a GPS device on the object holder 12 at a slanted position P1, and using as a table top for books and cups at a leveled position P2.

Further, the deployment rod 18 is pivotable relative to the extendable rod 16, that is, deployed away from the seatback 2. Thus, the object holder 12 is distanced away from the seatback 2 and can be rotated sufficiently and will not impact the use of the seat even at a slanted position.

Referring to FIGS. 3 and 4, according to one embodiment of the present disclosure, at a first position where the deployment rod 18 forms a first angle $\alpha$ with the extendable rod 16 is illustrated. The deployment rod 18 may be pivoted away from the seatback 2 and locked at the first angle $\alpha$ to the extendable rod 16. At the first position, the object holder 12 may be rotated at a first rotation direct A toward the seat. That is the deployment rod 18 may be pivoted and locked at the first position shown in FIG. 3 when the extendable rod 16 is extended. At the first position, the object holder 12 may be rotatable around a pivot to different positions. For example, the object holder 12 may be rotated at the first rotation direction A to the slanted position shown in FIG. 4 for the rear seat passenger to place an object such as a cell phone. The object holder 12 at the slanted position can provide comfortable reading experience for the passenger.

According to the above description, when the extendable rod 16 is at the extended position, the deployment rod 18 may rotate to the first position along a second rotation direction B opposite to the first direction A. In this manner, more space is provided for the object holder 12 so that the object holder 12 can be tilted toward the seat.

In another embodiment, the deployment rod 18 may include an extendable part. As such, at the first position, the passenger may vary a length of the deployment rod 18 to adjust a distance between the object holder 12 and himself/ herself based on his/her need so as to improve comfortability when using the object holding device 10.

Referring to FIGS. 3 and 5, when the deployment rod 18 is pivoted to the first position having the first angle α with the extendable rod 16, the object holder 12 may rotate at a second rotation direction B opposite to the first rotation direction A. Thus, the object holder 12 may be rotated to the leveled position P2. It should be noted that the leveled position P2 referred here may be a position at a horizontal direction, and may also be a position forming an angle with the horizontal direction.

According to one embodiment of the present disclosure, the first angle α may be 90°. It should be appreciated that the first angle may also be other degrees under specific situations. For example, the first angle α may be any degree from 0 to 180. In another embodiment, the object holding device may also be configured to have an adjustment device to adjust a suitable first angle α based on the passenger's need.

According to one embodiment, the extendable device 11 may further include a rail 20 attached to the seatback 2 and may be located in the map pocket 20. The extendable rod 16 may be slid and locked in the rail 20. A first end 19 of the deployment rod 18 is pivotally connected with object holder 12, and a second end 21 of the deployment rod 18 is pivotally connected with the extendable rod 16. To use the object holding device 10, the object holder 12 is pulled in an extending direction from the extendable rod 16 so that the extendable rod 16 slides in the rail 20 to a desired extending position.

According to one embodiment of the present disclosure, a lock member 36 may be disposed on one of the extendable rod 16 or the rail 20, and one of them includes at least one lock catch corresponding to the lock member 36. For example, in the embodiment depicted in FIG. 6, at least one lock member 36 is disposed on the rail 20, and a lock catch matching with the lock member 36 is disposed on the extendable rod 16 (the lock catch not shown as it is hidden behind the extendable rod 16). Of course, the lock member 36 may be disposed on the extendable rod 16 and the lock catch matching the lock member is dispose on the rail 20.

Figure 6:
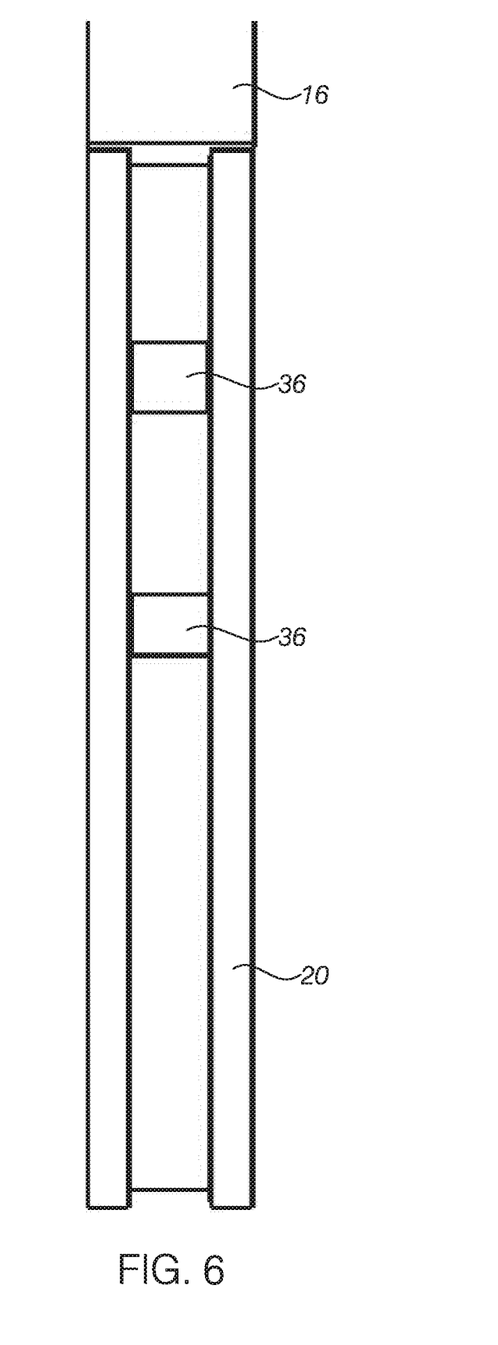
FIG. 6 is a partial enlarged view of a rail and an extending rod.

According to one embodiment of the present disclosure, the locking member 36 and the lock catch may include one of a magnetic device, a spring lock/lock catch device, and a thread bolt/nut mechanism. In another embodiment, the locking member 36 may include a plurality of magnets at different positions, and the lock catch is ferrous metal or a magnet. When the extendable rod 16 slides to the extended position, the locking member 36 and the lock catch may lock the extendable rod 16 at the plurality of positions. Thus, the extendable rod 16 may be extended and locked at different positions so that the object holder 12 may be maintained at different heights to satisfy the user's needs.

According to one embodiment of the present disclosure shown in FIG. 1 to 5, the object holder 12 includes a first surface 24 and a second surface 26 opposite to the first surface 24. As shown in FIG. 4, the first surface 24 faces the user and is a surface to retain the object at a slanted position P1. As shown in FIG. 5, the second surface 26 faces up and is a surface to hold the object at a leveled position. A clamping device 22 may be disposed on the first surface 24. When the object holder 12 is at the slanted position P1, the clamping device 22 may be used to grasp the objects, such as a cell phone, a laptop computer so that the user can secure the object stably on the object holder 12 without the need to use his/her hands.

Referring to FIG. 1 and FIG. 4, according to another embodiment, a sliding rail 28 may be included on the first surface 24. The clamping device 22 may include first and second clamping members 30, 32 slidable on the sliding rail 28. The first and second clamping members 30, 32 are slidable in the sliding rail 28 to adjust a width in-between so as to grasp the objects with different sizes. In some embodiments, the sliding rail 28 may be a groove on the first surface 24 that matches the protrusions of the first and second clamping members 30, 32. Alternatively, the sliding rail 28 may be a protrusion on the first surface 24 that may be received in the recessed on the first and second clamping members 30, 32.

According to another embodiment, a clamping device 22 may be disposed on the second surface 26. When the object is placed on the second surface 26, the clamping device 22 can retain the object from falling during the traveling of the vehicle.

According to an embodiment, the clamping device may include one or more of an in-vehicle electronic device support, a pen holder, and a name card holder. It should be appreciated that any devices used in the vehicle having a retaining function may be used as a clamping device.

Referring to FIG. 3, according to an embodiment of the present disclosure, an object support 34 may be disposed on an edge of the first surface 24 and adjacent to the first end 19 of the deployment rod 18 such that the object support is at a bottom when the object holder 12 is at the slanted position. When a passenger needs to place an object such as a book on the first surface 24, the object support 34 can keep the object on the first surface 24 to prevent it from sliding off.

According to an embodiment, a locking assembly may be disposed between the deployment rod 18 and the object holder 12 to lock and unlock them.

Figure 7:
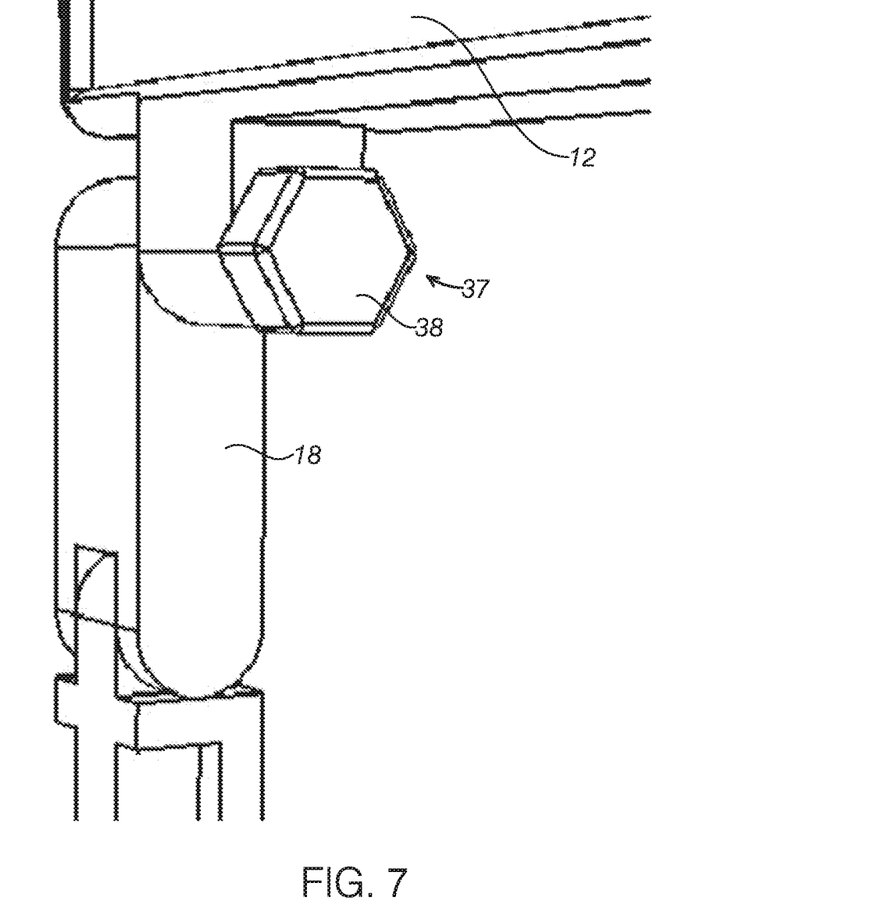
FIG. 7 is a partial enlarged view of a deployment rod and an object holder.

For example, in some embodiments, the locking assembly may include one of a support rod, a bi-directional ratchet mechanism, a threaded hole/screw mechanism and a spring lock/lock catch. In the embodiment shown in FIG. 7, the lock assembly 37 is a threaded hole and a screw 38 mechanism. When the object holder 12 is rotated to a suitable position, the screw 38 may be tightened to lock the object holder 12 at such position. When it is needed to adjust to another position, the screw 38 may be loosed at an opposite direct to enable the rotation of the object holder 12.

Figure 8:
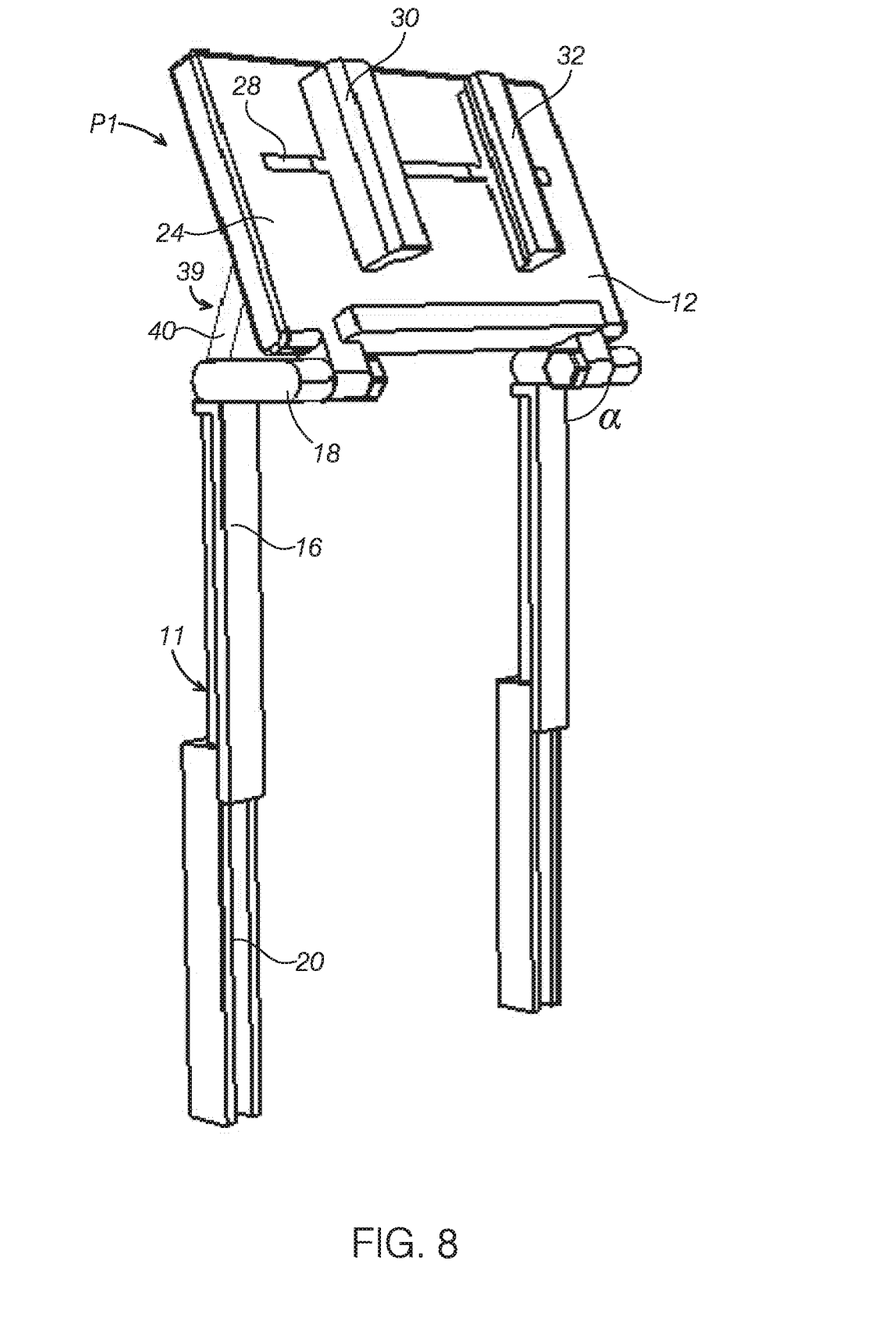
FIG. 8 is a schematic diagram of a lock assembly configured as support rod.

In an embodiment shown in FIG. 8, the lock assembly 39 is configured as a support rod structure. A rotatable support rod 40 may be disposed or connected on one of the deployment rod 18 or the object holder 12, and a plurality of receiving holes may be disposed on another one to receive the support rod 40. In this manner, the support rod 40 can retain the object holder 12 at multiple positions with an angle relative to the deployment rod 18 such that the object holder 12 may be adjusted to a suitable angle based on the need.

As described above, with the lock assembly, the object holder 12 can be pivoted to a position with any suitable angle to the deployment rod 18 and locked at such position for use. As such, the object holder 12 can secure the objects or devices to be held. Further, the object holder 12 can be adjusted to the best position based on the user's needs.

According to an embodiment of the present disclosure, the extendable rod 16 and the deployment rod 18 are pivotally connected, and may include a lock assembly to lock and unlock the extendable rod 16 and the deployment rod 18. For example, in the embodiment shown in FIG. 3, the lock assembly between the extendable rod 16 and the deployment rod 18 is implemented as surfaces abutting each other to be maintained at a locked position. In other embodiments, the lock assembly between the extendable rod 16 and the deployment rod 18 may include other mechanisms such as a threaded hole/screw mechanism or a spring lock/lock catch. Based on needs, there may be no lock assembly between the extendable rod 16 and the deployment rod 18.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions.

The following claims particularly point out certain combinations and subcombinations regarded as novel and non-obvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application.

The invention claimed is:

1. An object holding device used on a vehicle seat, comprising:
    an object holder, wherein the object holder is coupled to an extendable device via a deployment rod and is extended and retracted in and out a map pocket of the vehicle seat, and the object holder includes a first surface and a second surface opposite to the first surface,
    wherein an extendable rod of the extendable device is pivotably connected with the deployment rod and lockable with the deployment rod and wherein at a first position where the deployment rod forms a first angle with the extendable rod, the object holder is changeable at a slanted position and a leveled position to hold an object, and
    wherein the first surface is a retaining surface including one of an object support and an object clamping device to retain an object at the slanted position and the second surface is a holding surface for the object at the leveled position.

2. The object holding device of claim 1, wherein at the first position where the deployment rod forms the first angle with the extendable rod, the object holder is rotatable toward the vehicle seat to be at the slanted position.

3. The object holding device of claim 2, wherein at the first position where the deployment rod forms the first angle with the extendable rod, the object holder is rotatable away from the vehicle seat.

4. The object holding device of claim 1, wherein the first angle is about 90 degrees.

5. The object holding device of claim 1, wherein the extendable device further includes a rail disposed in the map pocket, the extendable rod is capable of sliding in the rail and being locked, and wherein one end of the deployment rod is pivotably connected with the extendable rod and another end of the deployment rod is pivotably connected with the object holder.

6. The object holding device of claim 1, wherein a sliding rail is disposed on the first surface, and the object clamping device includes a first clamping member and a second clamping member which are slidable in the sliding rail to adjust a width in-between, and the first and second clamping members collectively grasp the object.

7. The object holding device of claim 1, wherein the object support is disposed at an edge of the first surface and the object support is at a bottom of the first surface at the slanted position to support the object.

8. The object holding device of claim 1, further comprising a locking assembly disposed between the deployment rod and the object holder to lock and unlock the deployment rod and the object holder.

9. The object holding device of claim 8, wherein the locking assembly includes one of a support rod, a bi-directional ratchet mechanism, a threaded hole/screw mating mechanism and spring lock/catch.

10. An object holding device disposed on a seatback of a vehicle, comprising:
    a deployment rod having a first end and a second end;
    an object holder pivotably connected with the first end of the deployment rod; and
    an extendable rod pivotably connected to the second end of the deployment rod, wherein the extendable rod is extended and retracted along its length direction;
    wherein the deployment rod forms a first angle with the extendable rod at a first position, and the object holder is moveable between a slanted position and a leveled position when the deployment rod is at the first position,
    wherein the object holder has a first surface and a second surface opposite the first surface, wherein the first surface faces a user and includes one of an object support and an object clamping device to retain an object at the slanted position, and wherein the second surface faces up to hold the object at the leveled position.

11. The object holding device of claim 10, further comprising a rail attached to the seatback, wherein the extendable rod is slidably connected to the rail and lockable by a locking device.

12. The object holding device of claim 11, further comprising a map pocket, wherein the extendable rod and the deployment rod are concealed in the map pocket at a non-use position.

13. The object holding device of claim 11, wherein the extended rod includes a lock member and the rail includes a plurality of lock catches so that the extendable rod is locked at a plurality of positions to enable the object holder to be maintained at different heights.

14. The object holding device of claim 10, wherein the deployment rod is rotated away from the seatback to form the first angle, and the first angle is about 90 degrees at the first position.

15. The object holding device of claim 14, wherein the object holder is tilted away from a user at the slanted position and tilted toward the user to be substantially horizontal at the leveled position.

16. The object holding device of claim 15, wherein the object clamping device is attached to the first surface to hold the object at the slanted position.

17. The object holding device of claim 16, wherein the object support is adjacent to an edge to retain the object at the slanted position.

18. The object holding device of claim 10, wherein the deployment rod further includes an extended part to adjust a distance between the object holder and a user at a use position.

* * * * *